(12) United States Patent  
Meyer

(10) Patent No.: US 10,078,781 B2
(45) Date of Patent: Sep. 18, 2018

(54) AUTOMATICALLY ORGANIZING IMAGES

(71) Applicant: Google Inc., Mountain View, CA (US)

(72) Inventor: Cayden Meyer, Pyrmont (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/303,997

(22) Filed: Jun. 13, 2014

(65) Prior Publication Data

US 2015/0363640 A1 Dec. 17, 2015

(51) Int. Cl.
G06K 9/00 (2006.01)
G06F 17/30 (2006.01)
G06Q 10/10 (2012.01)

(52) U.S. Cl.
CPC ... *G06K 9/00456* (2013.01); *G06F 17/30247* (2013.01); *G06Q 10/10* (2013.01)

(58) Field of Classification Search
None
See application file for complete search history.

(56) References Cited

U.S. PATENT DOCUMENTS

| 5,507,845 | A | | 4/1996 | Molnar et al. |
| 5,579,471 | A | * | 11/1996 | Barber et al. ............ 715/700 |
| 6,006,239 | A | | 12/1999 | Bhansali et al. |
| 6,009,405 | A | | 12/1999 | Leymann et al. |
| 6,119,165 | A | | 9/2000 | Li et al. |
| 6,314,105 | B1 | | 11/2001 | Luong |
| 6,449,688 | B1 | | 9/2002 | Peters et al. |
| 6,590,568 | B1 | | 7/2003 | Astala et al. |
| 6,614,804 | B1 | | 9/2003 | McFadden et al. |
| 6,687,735 | B1 | | 2/2004 | Logston et al. |

(Continued)

FOREIGN PATENT DOCUMENTS

| EP | 0371608 | 6/1990 |
| EP | 1275222 | 1/2003 |

(Continued)

OTHER PUBLICATIONS

Automatic Album Maker Moment.me Arrives on Android, Adds A "Manual Mode" Mode to Boost Engagement, TechCrunch, Feb. 18, 2013, http://techcrunch.com/2013/02/18/automatic-album-maker-moment-me-arrives-on-android-adds-a-manual-mode-mode-to-boost-engagement/.

(Continued)

*Primary Examiner* — Sumati Lefkowitz
*Assistant Examiner* — Jiangeng Sun
(74) *Attorney, Agent, or Firm* — Young Basile Hanlon & MacFarlane, P.C.

(57) ABSTRACT

A method includes obtaining a plurality of images, including geolocation information and time information for each image. The method also includes identifying a group of related images from the plurality of images from a common geographical area and a common time period based on the geolocation information and the time information for each of the plurality of images, and identifying an event that occurred within the common time period and within the common geographical area by searching a repository of event information. The method also includes storing the group of related images in an image collection, and assigning a title to the image collection, wherein the title is based at least in part on a title of the event.

9 Claims, 4 Drawing Sheets

(56) References Cited

U.S. PATENT DOCUMENTS

| | | |
|---|---|---|
| 6,711,557 B1 | 3/2004 | Palaniappan |
| 6,947,396 B1 | 9/2005 | Salmi |
| 7,030,861 B1 | 4/2006 | Westerman et al. |
| 7,113,917 B2 | 9/2006 | Jacobi et al. |
| 7,146,377 B2 | 12/2006 | Nowicki et al. |
| 7,386,576 B2 * | 6/2008 | Watanabe et al. |
| 7,536,386 B2 | 5/2009 | Samji et al. |
| 7,620,902 B2 | 11/2009 | Manion et al. |
| 7,660,902 B2 | 2/2010 | Graham et al. |
| 7,711,771 B2 | 5/2010 | Kirnos |
| 7,756,821 B2 | 7/2010 | Havens et al. |
| 7,821,405 B2 | 10/2010 | Heidloff et al. |
| 7,827,299 B2 | 11/2010 | Cadarette et al. |
| 7,904,303 B2 | 3/2011 | Chien et al. |
| 7,908,183 B2 | 3/2011 | Jacobi et al. |
| 7,945,600 B1 | 5/2011 | Thomas et al. |
| 8,041,672 B2 | 10/2011 | Ogawa et al. |
| 8,132,111 B2 | 3/2012 | Baron et al. |
| 8,156,059 B2 | 4/2012 | Dunning et al. |
| 8,194,986 B2 * | 6/2012 | Conwell ............... 382/224 |
| 8,196,047 B2 | 6/2012 | Fisher et al. |
| 8,285,700 B2 | 10/2012 | Steelberg et al. |
| 8,298,087 B1 | 10/2012 | Smith |
| 8,407,613 B2 | 3/2013 | Hope |
| 8,412,731 B2 | 4/2013 | Aubert et al. |
| 8,417,000 B1 | 4/2013 | Mendis |
| 8,429,565 B2 | 4/2013 | Agarawala et al. |
| 8,458,174 B1 | 6/2013 | Duerig |
| 8,464,184 B1 | 6/2013 | Cook et al. |
| 8,467,955 B2 * | 6/2013 | Jiang et al. ............ 701/408 |
| 8,468,164 B1 | 6/2013 | Paleja et al. |
| 8,479,122 B2 | 7/2013 | Hotelling et al. |
| 8,504,565 B2 | 8/2013 | Pitts |
| 8,522,230 B2 | 8/2013 | Nathan et al. |
| 8,522,258 B1 * | 8/2013 | Shaw ..................... 719/318 |
| 8,532,400 B1 | 9/2013 | Babenko et al. |
| 8,547,352 B2 | 10/2013 | Park et al. |
| 8,548,844 B2 | 10/2013 | Steelberg et al. |
| 8,555,173 B2 | 10/2013 | Kast |
| 8,560,975 B2 | 10/2013 | Beaver et al. |
| 8,571,331 B2 | 10/2013 | Cifarelli |
| 8,584,022 B1 | 11/2013 | O'Shaughnessy et al. |
| 8,612,439 B2 | 12/2013 | Prahlad et al. |
| 8,612,470 B1 | 12/2013 | Fushman et al. |
| 8,624,836 B1 | 1/2014 | Miller et al. |
| 8,638,312 B2 | 1/2014 | Lim |
| 8,644,688 B2 | 2/2014 | Fishman et al. |
| 8,661,053 B2 | 2/2014 | Flynn et al. |
| 8,670,597 B2 | 3/2014 | Petrou et al. |
| 2002/0054117 A1 | 5/2002 | van Dantzich et al. |
| 2002/0099844 A1 | 7/2002 | Baumann et al. |
| 2002/0112116 A1 * | 8/2002 | Nelson ................... 711/103 |
| 2002/0116399 A1 | 8/2002 | Camps et al. |
| 2002/0167538 A1 | 11/2002 | Bhetanabhotla |
| 2002/0178271 A1 | 11/2002 | Graham et al. |
| 2002/0184375 A1 | 12/2002 | Wagner et al. |
| 2003/0184653 A1 | 10/2003 | Ohkubo |
| 2003/0208490 A1 | 11/2003 | Larrea et al. |
| 2004/0085578 A1 * | 5/2004 | Quek ................. G06Q 30/02 358/1.18 |
| 2004/0135904 A1 | 7/2004 | Shiota et al. |
| 2004/0189707 A1 | 9/2004 | Moore et al. |
| 2004/0201740 A1 * | 10/2004 | Nakamura ........ G06F 17/30265 348/231.3 |
| 2005/0033777 A1 | 2/2005 | Moraes et al. |
| 2005/0131992 A1 | 6/2005 | Goldstein et al. |
| 2006/0059174 A1 | 3/2006 | Mese et al. |
| 2006/0159127 A1 | 7/2006 | Childress et al. |
| 2006/0229932 A1 | 10/2006 | Zollo et al. |
| 2006/0242581 A1 | 10/2006 | Manion et al. |
| 2007/0250401 A1 | 10/2007 | Hearn et al. |
| 2008/0123904 A1 | 5/2008 | Sakamoto et al. |
| 2008/0126476 A1 | 5/2008 | Nicholas et al. |
| 2008/0165141 A1 | 7/2008 | Christie |
| 2008/0177623 A1 | 7/2008 | Fritsch et al. |
| 2008/0195956 A1 | 8/2008 | Baron et al. |
| 2008/0270398 A1 | 10/2008 | Landau et al. |
| 2009/0112868 A1 | 4/2009 | Rajamani et al. |
| 2009/0327975 A1 | 12/2009 | Stedman |
| 2010/0017426 A1 | 1/2010 | Marston |
| 2010/0046392 A1 | 2/2010 | Childress et al. |
| 2010/0070707 A1 | 3/2010 | Nishimura |
| 2010/0161441 A1 | 6/2010 | Hounsell |
| 2010/0211575 A1 | 8/2010 | Collins et al. |
| 2010/0241971 A1 | 9/2010 | Zuber |
| 2010/0250337 A1 | 9/2010 | Kassaei |
| 2010/0251305 A1 | 9/2010 | Kimble et al. |
| 2010/0256981 A1 * | 10/2010 | Nielsen et al. ............ 705/1.1 |
| 2010/0332846 A1 | 12/2010 | Bowden et al. |
| 2010/0332958 A1 * | 12/2010 | Weinberger et al. ......... 715/201 |
| 2011/0010672 A1 | 1/2011 | Hope |
| 2011/0044512 A1 | 2/2011 | Bambha et al. |
| 2011/0208668 A1 | 8/2011 | Phillips |
| 2011/0289423 A1 | 11/2011 | Kim et al. |
| 2012/0032436 A1 | 2/2012 | Zantout et al. |
| 2012/0072449 A1 | 3/2012 | Patch et al. |
| 2012/0078845 A1 | 3/2012 | Kasbekar et al. |
| 2012/0084689 A1 | 4/2012 | Ledet et al. |
| 2012/0089610 A1 | 4/2012 | Agrawal et al. |
| 2012/0096046 A1 | 4/2012 | Kucera |
| 2012/0136936 A1 | 5/2012 | Quintuna |
| 2012/0192086 A1 | 7/2012 | Ghods et al. |
| 2012/0197980 A1 | 8/2012 | Terleski et al. |
| 2012/0213404 A1 * | 8/2012 | Steiner ..................... 382/103 |
| 2012/0233227 A1 | 9/2012 | Alexander et al. |
| 2012/0254332 A1 | 10/2012 | Irvin |
| 2012/0290609 A1 | 11/2012 | Britt |
| 2012/0290926 A1 | 11/2012 | Kapadia et al. |
| 2012/0290947 A1 | 11/2012 | Baggett et al. |
| 2012/0303477 A1 | 11/2012 | Ben-Itzhak |
| 2012/0303684 A1 | 11/2012 | Sakurai et al. |
| 2012/0324368 A1 | 12/2012 | Putz et al. |
| 2013/0014023 A1 | 1/2013 | Lee et al. |
| 2013/0024464 A1 | 1/2013 | Berner et al. |
| 2013/0073976 A1 | 3/2013 | McDonald et al. |
| 2013/0080940 A1 | 3/2013 | Reeves et al. |
| 2013/0104080 A1 | 4/2013 | Bosworth et al. |
| 2013/0132896 A1 | 5/2013 | Lee et al. |
| 2013/0138674 A1 | 5/2013 | Jeong et al. |
| 2013/0138685 A1 | 5/2013 | Brucher et al. |
| 2013/0156275 A1 * | 6/2013 | Amacker ........... G06K 9/00677 382/118 |
| 2013/0173637 A1 | 7/2013 | Kim et al. |
| 2013/0185638 A1 | 7/2013 | Tischer |
| 2013/0188886 A1 | 7/2013 | Petrou et al. |
| 2013/0202198 A1 | 8/2013 | Adam et al. |
| 2013/0263289 A1 | 10/2013 | Vijayan et al. |
| 2013/0339180 A1 * | 12/2013 | LaPierre ............... G06Q 50/01 705/26.7 |
| 2013/0339435 A1 | 12/2013 | De Armas |
| 2014/0019317 A1 | 1/2014 | Casares et al. |
| 2014/0019910 A1 | 1/2014 | Kim et al. |
| 2014/0029798 A1 | 1/2014 | Flynn et al. |
| 2014/0067702 A1 | 3/2014 | Rathod |
| 2014/0068443 A1 * | 3/2014 | Eng et al. .................. 715/733 |
| 2014/0164535 A1 | 6/2014 | Lynch et al. |
| 2014/0236722 A1 * | 8/2014 | Rathus et al. ............ 705/14.54 |
| 2014/0317552 A1 | 10/2014 | Romatoski |
| 2015/0193521 A1 | 7/2015 | Schoeffler et al. |
| 2015/0363062 A1 | 12/2015 | Gunn |

FOREIGN PATENT DOCUMENTS

| | | |
|---|---|---|
| EP | 2187322 A1 | 5/2010 |
| EP | 2458512 | 5/2012 |
| WO | WO2000051021 | 8/2000 |
| WO | WO2003090096 | 10/2003 |

(56) References Cited

FOREIGN PATENT DOCUMENTS

| WO | WO2007085083 | 8/2007 |
| WO | WO2009032712 | 3/2009 |
| WO | WO2012092025 | 7/2012 |

OTHER PUBLICATIONS

Flayvr, A Mobile App That Automatically Creates Photo Albums, Raises $450K Seed Round, TechCrunch, Oct. 4, 2012, http://techcrunch.com/2012/10/04/flayvr-a-mobile-app-that-automatically-creates-photo-albums-raises-450k-seed-round/.
David G. Lowe, "Object recognition from local scale-invariant features," International Conference on Computer Vision, Corfu, Greece (Sep. 1999), pp. 1150-1157.
ISR and Written Opinion of the International Searching Authority for International Application No. PCT/US2015010618, dated Mar. 25, 2015.
Larson, Michael, "Probing Network Characteristics: A Distributed Network Performance Framework", Dr. Dobb's Journal, Jun. 2004, pp. 22-29.
International Search Search Report & Written Opinion, RE: Application # PCT/US2015/020375; dated Jun. 12, 2015.
International Search Search Report & Written Opinion, RE: Application #PCT/US2015/020378; dated Aug. 18, 2015.

* cited by examiner

AUTOMATICALLY ORGANIZING IMAGES

BACKGROUND

Digital photographs are commonly stored on a computer, portable computing device, camera, or other computing device in a manner that allows them to be reviewed by a user at a later time. It is not common, however, for digital photographs to be associated with rich identifying information or contextual information. Instead, digital photographs often have very little useful information in their name or in associated metadata to identify them, unless a user takes affirmative steps to rename the photographs and/or add metadata to the photographs (e.g. "tagging").

One type of information that is usually available is the date and time on which a digital photograph was taken. Date and time information is useful, but may not be sufficient to allow users to find a particular photograph among a large number of photographs or to find a photograph taken long ago.

Users sometimes manually organize photographs into albums. Commonly, albums are named after events, places, people, dates or a combination of the above. Manually organizing photographs and naming albums can be time consuming.

SUMMARY

The disclosure relates generally to automatically organizing images.

One aspect of the disclosed embodiments is a method that includes obtaining a plurality of images, obtaining geolocation information for each image, and obtaining time information for each image. The method also includes identifying, by one or more computing devices, a group of related images from the plurality of images from a common geographical area and a common time period based on the geolocation information and the time information for each of the plurality of images, and identifying, by the one or more computing devices, an event that occurred within the common time period and within the common geographical area by searching a repository of event information. The method also includes storing, by the one or more computing devices, the group of related images in an image collection, and assigning, by the one or more computing devices, a title to the image collection, wherein the title is based at least in part on a title of the event.

Another aspect of the disclosed embodiments is a method that includes obtaining a plurality of images, and identifying a group of related images from the plurality of images. The method also includes extracting visible features from at least some images from the plurality of images and identifying, by one or more computing devices, one or more text-based feature labels for at least some of the extracted visible features by comparing the extracted visible features to a repository of images that include indexed features. The method also includes storing, by the one or more computing devices, the group of related images in an image collection and assigning, by the one or more computing devices, a title to the image collection, wherein the title is based at least in part on the one or more text-based feature labels.

Another aspect of the disclosed embodiments is a method that includes obtaining a plurality of images that are associated with a user and obtaining geolocation information for each of the images. The method also includes defining, by one or more computing devices and based on the geolocation information, a plurality of image groups that each include a plurality of images that correspond a distinct geographical area. The method also includes identifying, by the one or more computing devices, a home location for the user and identifying, by the one or more computing devices, a first image group from the plurality of image groups that does not correspond to the home location for the user. The method also includes storing, by the one or more computing devices, the images from the first image group in an image collection and assigning, by the one or more computing devices, a title to the image collection, wherein the title is based at least in part on the distinct geographical area for the first image group.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
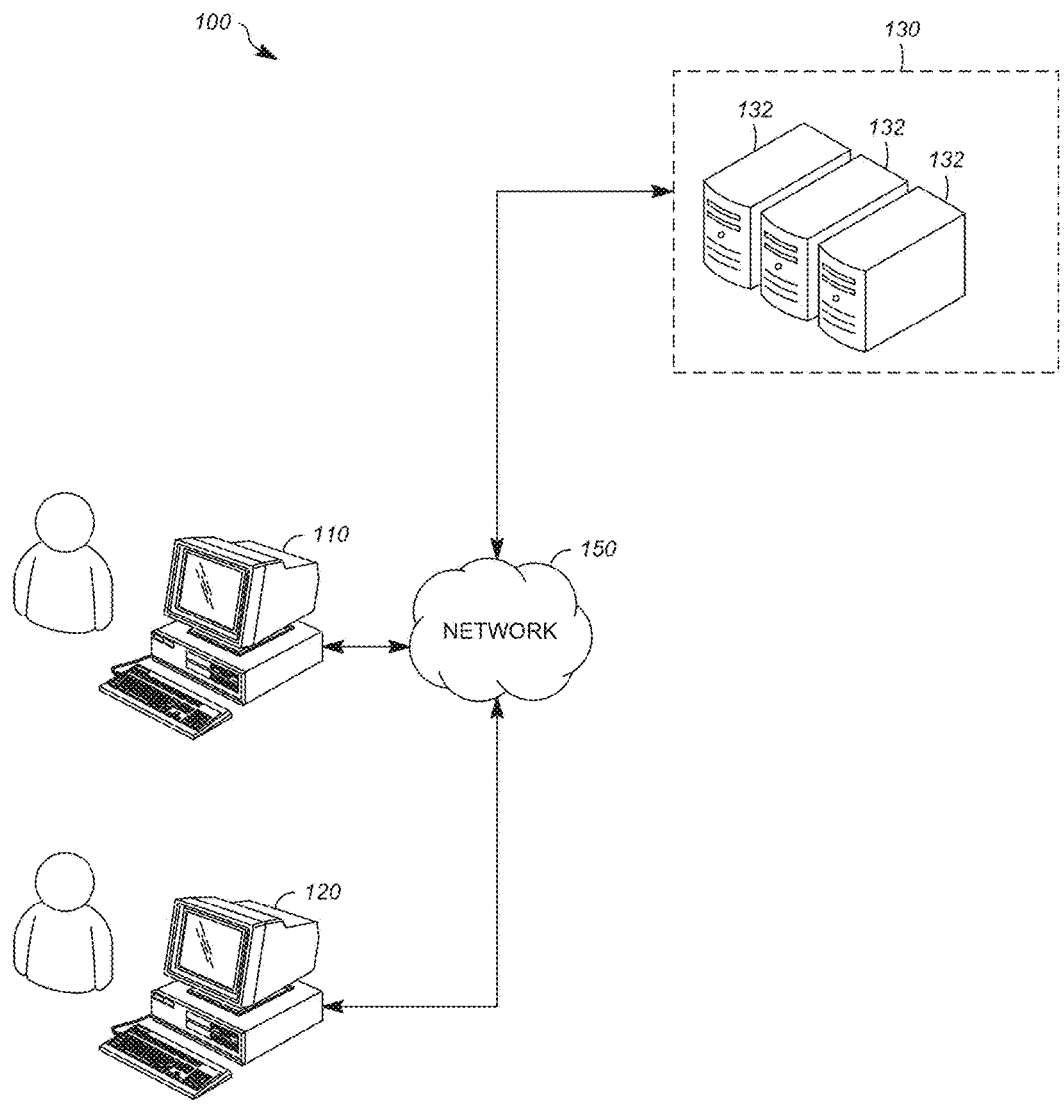
FIG. 1 is a block diagram showing an example of an environment in which a system for automatically organizing images can be implemented.

According to the methods, systems, apparatuses, and computer programs that are discussed herein digital images such as digital photographs can be automatically organized by grouping the digital images and placing the digital images into albums that are titled based on information associated with the digital images. Thus, a plurality of images can be FIG. 1 shows an example of an environment 100 in which a system for automatically organizing images can be implemented. The environment 100 can include a user system 110, one or more additional user systems 120, and an application hosting service 130. The user system 110 and the additional user systems 120 are each representative of a large number (e.g. millions) of systems that can be included in the environment 100, with each system being able to utilize one or more applications that are provided by the application hosting service 130. The user system 110 and the additional user systems 120 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the additional user systems 120, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the additional user systems 120. One or more of the hosted applications can be a storage system that is operable to implement storage and retrieval functions and output, for display to a user, a user interface that allows the user to store, browse, organize, retrieve, view, delete, and/or perform other operations with respect to digital images that are stored as data files at the application hosting service 130. The digital images can be arranged by a hierarchical manner, such as a folder structure. The application hosting service can allow access to store, edit, delete, and/or view the digital images by a single user, by a group of designated users, or by all users. The user interface for the storage system can be output by the application hosting service 130 for display at a device associated with the user, such as the user system 110, by transmission of signals and/or data from the application hosting service to the user system 110 that, when interpreted by the user system 110, cause display of the interface at the user system 110.

Figure 2:
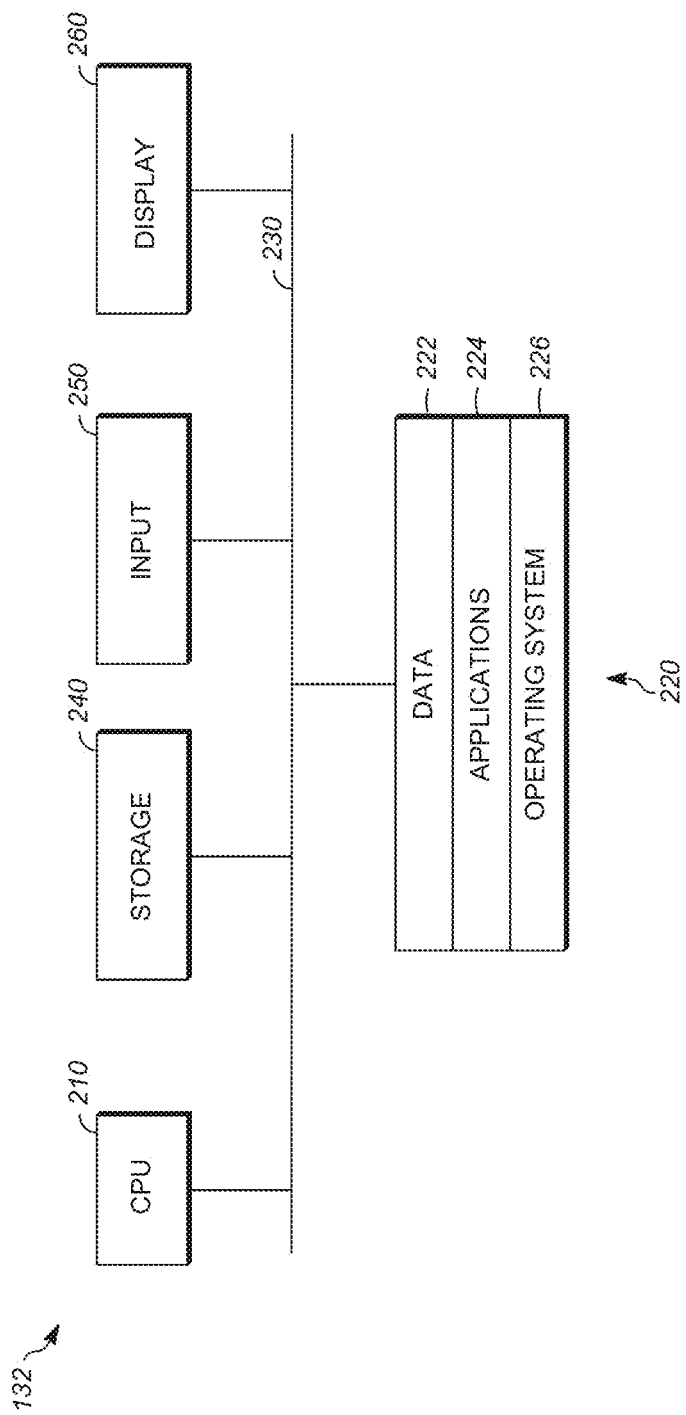
FIG. 2 is a block diagram showing an example of a hardware configuration for a server computer.

FIG. 2 is a block diagram of an example of a hardware configuration for the one or more server computers 132 of FIG. 1. The same hardware configuration or a similar hardware configuration can be used to implement the user system 110 and the additional user systems 120. Each server computer 132 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

Each server computer 132 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

Although FIG. 2 depicts the CPU 210 and the memory 220 of each server computer 132 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 132 can be composed of multiple buses. Further, the storage device 240 can be directly coupled to the other components of the respective server computer 132 or can be accessed via a network and can comprise a single integrated unit such as a memory card or multiple units such as multiple memory cards. The one or more server computers can thus be implemented in a wide variety of configurations.

Figure 3:
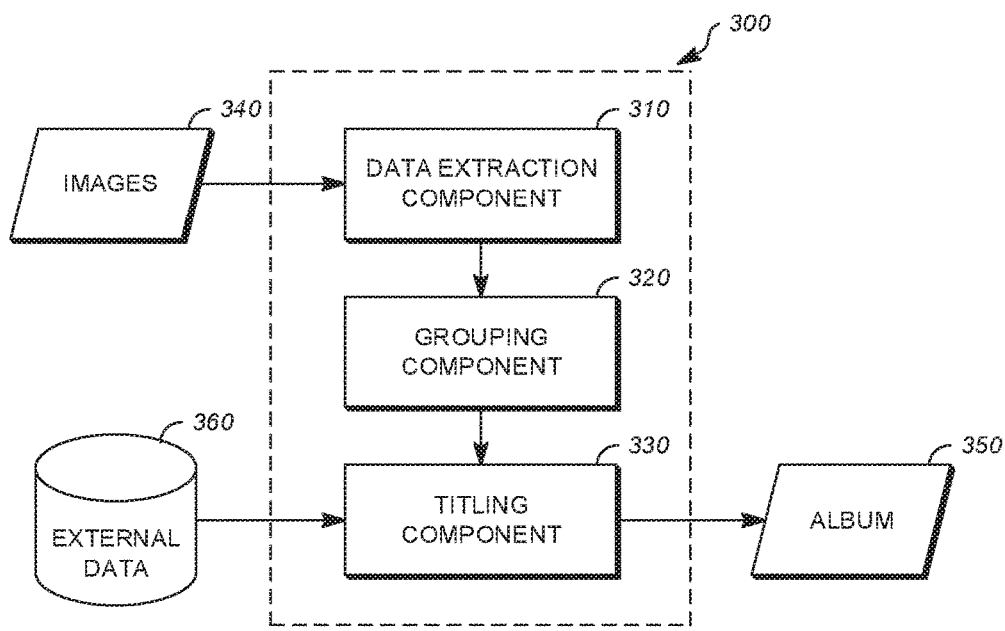
FIG. 3 is a block diagram showing operation of an image organizing system.

FIG. 3 is a block diagram showing an image organizing system 300. The image organizing system 300 includes a data extraction component 310, a grouping component 320, and a titling component 330.

The image organizing system 300 receives a plurality of images 340 as an input and generates an album 350 (i.e. a digital photo album) as an output. The images 340 can be any group or collection of images, and can be unorganized images that are not associated with user-defined tags, labels, categories, or collections. In some implementations, the images 340 are images stored at a server-based storage system and are associated with a user-account at the server-based storage system. In some implementations, the images 340 are received from a single image capture device, such as a digital camera or a smart phone with an integrated digital camera. The images 340 can be in any suitable digital image format, with the JPEG format being a typical example.

The images 340 can each be associated with metadata that describes some characteristic associated with the image. One example of metadata that can be associated with any or all of the images 340 is time information that describes when the image was recorded (e.g. by a digital camera). Time information can be in the form of a time stamp including a value or values representing the date and/or time at which the image was recorded. Another example of metadata that can be associated with any or all of the images 340 is geolocation information (e.g. coordinates) that describes the location at which the device that recorded the image was situated at the time when the image was recorded.

The image organizing system 300 can be implemented using any computing device that is operable to receive the images 340, execute instructions operable to perform the functions associated with the image organizing system 300, and output the album 350. As one example, the image organizing system 300 can be implemented as a hosted application at the application hosting service 130, the images 340 can be received from the storage system that is implemented by the application hosting service 130, and the album 350 generated in this example will be accessible using the storage system of the application hosting service 130 via an interface that is displayed by a remote computing device through a web browser application or a dedicated application. As another example, the image organizing system 300 can be implemented as a local application at the user system 110, the images 340 can be received from a local file system of the user system 110, and the album 350 can be generated as, for example, a folder containing a subset of the images 340.

The data extraction component 310 is operable to obtain information for each of the images 340. Obtaining information for an image can include accessing information stored within the image itself, accessing information stored in association with the image, or using the information stored within or in association with the image to access external information that is relevant to the image but is not associated with the image.

Information contained in the image itself includes information describing one or more visible features of the image as represented by the pixel values of the image. For example, the images 340 can be processed to extract visible features from them. Visible features can be extracted from the images 340 in any suitable manner. The visible features that are extracted from the images 340 can then be compared with known features, as will be discussed further herein. Methods of extracting visible features and identifying them by comparing them to known features are well known in the art. For example, methods of object recognition in images are described in David G. Lowe, "Object recognition from local scale-invariant features," International Conference on Computer Vision, Corfu, Greece (September 1999), pp. 1150-1157.

Information associated with the image includes metadata that is written by the image capture device (e.g. digital camera) that recorded the image and metadata that is added to the image after it is recorded, such as by manual entry of the metadata by a user. Metadata can include many types of information, including geolocation information and time information, as previously noted.

The information extracted from the images 340 by the data extraction component 310 is passed to the grouping component 320. The grouping component 320 is operable to identify a group of related images from the plurality of images 340. The grouping component 320 can group images based on a single characteristic or based on a combination of multiple characteristics.

As one example, images can be grouped by the grouping component 320 based on geolocation information. In one example, a first image is selected, and other images that were recorded at locations within a determined distance are grouped with the first image. In another example, the locations at which images were recorded are determined, and a clustering algorithm can be utilized to define clusters of images, with each cluster including images that were recorded within a certain geographic proximity of one another, as determined by the clustering algorithm. Clustering algorithms are well-known, with a k-means clustering algorithm being an example of a suitable clustering algorithm. A relatedness metric that represents a probability that the images in the group are actually related (i.e. grouped correctly) can be generated for each group by the clustering algorithm.

As another example, images can be grouped by the grouping component 320 based on time information. In one example, images within a predetermined time window can be considered related. In another example, a clustering algorithm can be used to generate time based clustering algorithms, and a relatedness metric can be generated as previously described.

As another example, images can be grouped by grouping component 320 based on visible features in the images. Visible features are extracted as previously described, and images are grouped based on the presence of common or similar visible features. For example, if a particular object appears in multiple images, a group can be defined that includes those images.

As another example, images can be grouped by grouping component 320 based on visible features in the images. Visible features are extracted as previously described, and images are grouped based on the presence of common or similar visible features.

As another example, images can be grouped by grouping component 320 based on inclusion of related subject matter. In this example, visible features are extracted from each of the images by the data extraction component 310, and those features are identified using external information such as a repository of feature information, with visible features in the repository being associated with annotations in the form of text-based labels that are associated with individual features. Those text-based labels are associated with the images, and the grouping component then groups the images based on semantic relatedness. For example, among pictures taken at a birthday party, the images might include features such as presents, cake, and decorations, these features can be identified as semantically related based on their common association with the concept of a party, and this can be used by the grouping component as a basis for defining a group of related images.

As previously mentioned, multiple characteristics can be combined by the grouping component to identify a group of related images. In one implementation, groups of possibly related images can be defined, and the relatedness metric is calculated for each of multiple characteristics. As an example, geographic clustering could be biased using time information, such that larger and/or less-well defined geographic clusters would be identified as related images if those images were captured within a related time period. In a scenario where a user is on a vacation at a location that is far from their home, the result may be a plurality of images that form a loose geographical cluster, as the user travels within a region and visits multiple areas over the course of several days. Although loosely defined, this cluster would be distinct from those clusters around the user's home, and since the images are clustered time-wise over the span of a few days, these two circumstances can, in combination, be sufficient for the grouping component 320 to define a group that includes those images.

The foregoing are examples of characteristics and combinations of that can be utilized by the grouping component 320 as a basis for identifying a group of related images. Any other characteristic obtained from information in the image, information associated with the image, or identified based on information in or associated with the image can be utilized as a basis for identifying groups of related images. In addition, any combination of these characteristics can be utilized as a basis for identifying groups of related images.

Information identifying the group of related images that was identified by the grouping component 320 is passed to the titling component 330. This information can include, for example, a list of the images. The titling component 330 is operable to assign a title to the group of related images, and this title is utilized as the title of the album 350 that is generated by the image organizing system 300.

The titling component 330 is operable to determine the title for the album based at least in part on the information extracted from images by the data extraction component 310. Any of the previously discussed characteristics can be utilized as a basis for determining the title, as well as any other characteristic based on the extracted information. The titling component 330 is operable to access the external data 360, and to utilize the external data 360 to generate the title for the album 350.

Any type of relevant information can be utilized as the external data 360. Information utilized by the titling component may be associated with the user or may not be associated with the user. Types of publicly available information that can be utilized as the external data 360 include, but are not limited to, information obtained from a search engines, web pages, or other publicly accessible databases. One example of publicly available information is a repository of geographical feature information. Another such example of publicly available information is a repository of information describing events, including the place of the event and the time at which it was held, which can be accessed from or compiled from a publicly available data source. Specific examples of information describing events include list of concerts held at a specific venue, a list of sporting events at a stadium, or a list of events at a convention center. An example of an information source that may be publicly available or private to the user (e.g. accessed by the image organizing system 300 via permission from the user) is a repository of images that include indexed features, where the indexed features can be objects, landmarks, persons, or other features. Examples of information that are private to the user and accessed with user permission and, in some cases, login credentials, include electronic mail messages associated with the user, calendar data associated with the user.

In particular, the information from the data extraction component 310 is utilized to identify an external data source to provide the external data 360. This is done based on the data type or characteristic type of the information provided by the data extraction component 310. The information from the image is then utilized in conjunction with the external data 360. In a simple example, where a group of related images is defined based on geolocation information, a repository of geographic features is selected as the source of the external data 360, and the geolocation information from the images is utilized to identify a geographic feature such as a city, state, country province, or landmark that is relevant to the geolocation information. For example, based on the geolocation information and the external data 360 it is determined that the images in the group are taken in the vicinity of the Eiffel Tower, the titling component could generate a title such as "Eiffel Tower" or "42 photos near the Eiffel Tower."

Titling groups of images using geographic features names is of particular relevance when the user is away from their home location (i.e. where the user lives or spends a significant amount of time). Thus, the titling component 330 can be configured such that it is more likely to select a location-based title when the user is away from their home location. Thus, when the titling component 330 determines that a group of related images does not correspond to the user's home location, the titling component 330 can generate a title for the group of images that corresponds to a distinct geographical area that corresponds to the images in the group.

The home location can be obtained from the user or can be obtained from the images 340. In one example, the home location is a user-specified value that is provided by the user as an input to the image organizing system 300. In another example, the home location is obtained from a data source associated with the user that indicates where the user is normally located, such as a social networking profile associated with the user or an email signature that contains an address. In another example, the plurality of images 340 can be clustered geographically and the image organizing system 300 can select the distinct geographic area of the largest image groups or the geographic area containing the largest number or image groups or the geographic area containing the most images as the user's home location. As another example, using time information for each of the images 340, the image organizing system can identify the home location based on patterns over time, such as by selecting the user's home location as the distinct geographical area having the largest number of time-based clusters.

Multiple characteristics can be utilized by the titling component 330 as the basis for a single title. Continuing the example above where a group of photographs are taken near the Eiffel tower, if the extracted information also includes information describing faces recognized in the photographs via facial recognition technology, photographs of the user's social networking contacts or other images associated with persons can be utilized as the external data 360, and text-based labels (i.e. names of persons) can be assigned to the recognized faces by matching them to the external data 360. The resulting title generated by the titling component 330 might then become "at the Eiffel Tower with Chris and Samantha." As a further example, when the images in the group are associated with a common time period, the titling component 330 can base the title in part on the common time period. The resulting title generated by the titling component 330 might then become "at the Eiffel Tower with Chris and Samantha in May 2014."

The titling component 330 can identify multiple types of information that each correspond to a descriptor that can be incorporated in a title. In some implementations, the titling component is able to determine which of these descriptors to incorporate in the title and how to incorporate them. As one example, the titling component can utilize a decision tree to determine titles. The decisions made in the decision tree can be based in part on absence or presence of particular types of descriptors, and the result of the decision tree is selection of a template that is populated with the descriptors to generate the title. In another example, machine learning can be utilized to select titles by generating a title selection model. In this example, when a title is generated, it is suggested to the user, and acceptance or rejection of the title by the user can be utilized as an additional training input for the title selection model.

After the title is determined by the titling component, the image organizing system stores the group of related images in an image collection, such as the album 350 and assigns the title to the image collection. The image collection is stored in association with the title in a form that allows the user to identify the image collection and gain insight into its contents based on the title. For example, where images are stored in folder-based album, the title can be assigned as the name of the folder.

Figure 4:
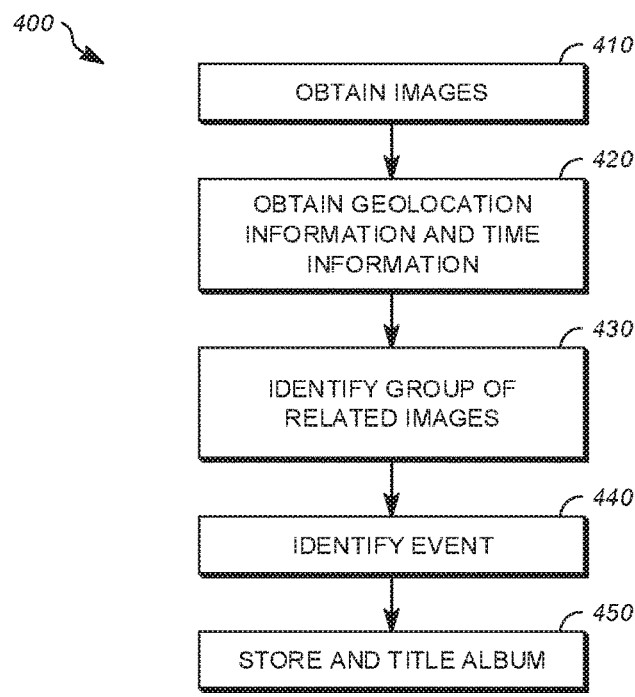
FIG. 4 is a flowchart showing a first example of a process for automatically organizing images.

FIG. 4 is a flowchart showing a first example of a process 400 for organizing images. The operations described in connection with the process 400 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 400 can be embodied as a non-transitory computer readable storage medium including program instructions executable by one or more processors that, when executed, cause the one or more processors to perform the operations. For example, the operations described in connection with the process 400 could be stored at the memory 220 of one of the server computers 132 and be executable by the CPU 210 thereof.

In operation 410, a plurality of images is obtained. Obtaining images means that they become available for processing by a computing device such as the one or more server computers in any manner. Examples of obtaining images include accessing the images from memory, accessing the images from a storage device, receiving the images via network transmission, and accessing the images from a user account. In some implementations, the images obtained at operation 410 are related in some manner, such as by association with a single user, location in a common folder, or having been recorded by the same image capture device.

Operation 420 includes obtaining geolocation information and time information for each of the images obtained at operation 410. This can be performed as described with respect to the data extraction component 310.

Operation 430 includes identify a group of related images from the plurality of images obtained at operation 410. The group of images identified at operation 430 can be a subset of the images obtained at operation 410. In one implementation, the group of images that is identified at operation 430 is identified based on a common geographical area and a common time period based for the images, based on the geolocation information and the time information for each of the images. This can be performed in the manner described with respect to the grouping component 320.

In operation 440, the common time period and the common geographical area are utilized to identify an event that occurred within the common time period and within the common geographical area. This can be done by searching a repository of event information using the common time period and the common geographical area as inputs, as explained with respect to the titling component 330. In some implementations, the repository of event information includes information obtained from a publicly available source. In some implementations, the repository of event information includes non-public information that is associated with a user. In some implementations, each of the plurality of images is associated with a user and the repository of event information includes calendar data associated with the user. In some implementations, each of the plurality of images is associated with a user and the repository of event information includes information obtained from electronic mail messages that are associated with the user.

In operation 450, the images are stored in an image collection such as an album, and a title is assigned to the image collection. The title is based at least in part on a name of the event that was identified at operation 440. This can be done in the manner described with respect to the titling component 330.

Figure 5:
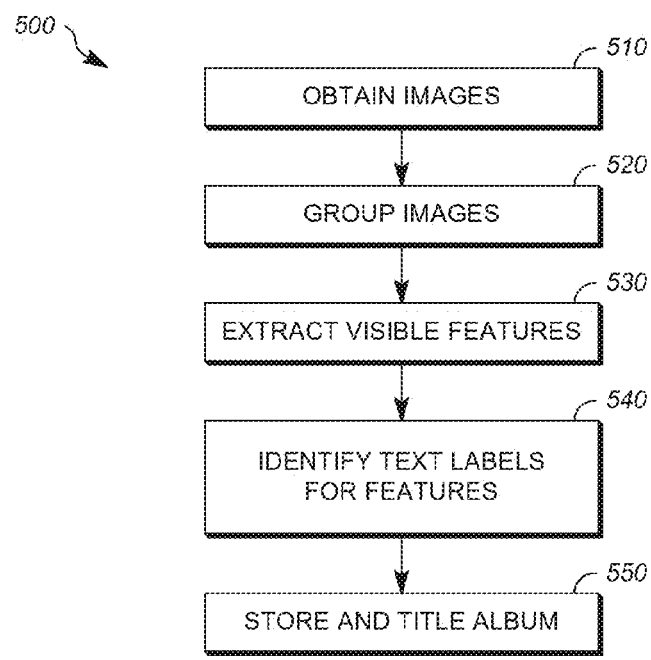
FIG. 5 is a flowchart showing a second example of a process for automatically organizing images.

FIG. 5 is a flowchart showing a second example of a process 500 for organizing images. The operations described in connection with the process 500 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 500 can be embodied as a non-transitory computer readable storage medium including program instructions executable by one or more processors that, when executed, cause the one or more processors to perform the operations. For example, the operations described in connection with the process 500 could be stored at the memory 220 of one of the server computers 132 and be executable by the CPU 210 thereof.

In operation 510, a plurality of images is obtained, as described previously. In operation 520 a group of related images is identified in the manner described with respect to the grouping component 320, where the group can be a subset of the images obtained at operation 510. The group can be defined in part based on geolocation information and/or time information that are associated with the images.

Operation 530 includes extracting visible features from at least some images from the plurality of images. This can be performed, for example, as described with respect to the data extraction component 310.

In operation 540 one or more text-based feature labels are identified for at least some of the extracted visible features by comparing the extracted visible features to a repository of images that include indexed features. 9. Indexed features can be visible portions of an image that are associated with information, such as feature vectors, that make the features searchable. The one or more text-based feature labels can be obtained from the repository of images, by identifying an image in the repository that has both a matching indexed feature and annotation information that describes the matching feature. The annotation data is then used as the text-based feature label for the subject feature in the image being analyzed.

In operation 550, the images are stored in an image collection such as an album, and a title is assigned to the image collection. The title is based in part of on the text-based feature labels for the images in the group. Where multiple feature labels are present, they can be ranked and the top-ranked label can be selected for inclusion in the title. Alternatively, semantic analysis can be utilized to identify a common subject matter descriptor based on the text based feature labels, and this descriptor can be incorporated in the title. This can be done in the manner described with respect to the titling component 330. In some implementations the title is also based in part on additional information, such as a name representing a common geographical area for the images or a name representing a common time period for the images.

Figure 6:
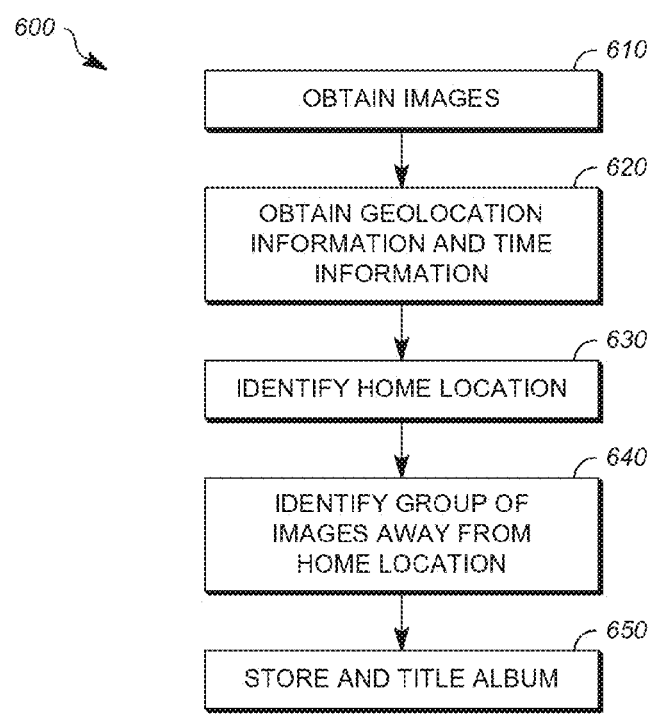
FIG. 6 is a flowchart showing a third example of a process for automatically organizing images.

FIG. 6 is a flowchart showing a second example of a process 600 for organizing images. The operations described in connection with the process 600 can be performed at one or more computers, such as at the one or more server computers 132 of the application hosting service 130. When an operation is described as being performed by one or more computers, it is completed when it is performed by one computer working alone, or by multiple computers working together. The operations described in connection with the process 600 can be embodied as a non-transitory computer readable storage medium including program instructions executable by one or more processors that, when executed, cause the one or more processors to perform the operations. For example, the operations described in connection with the process 600 could be stored at the memory 220 of one of the server computers 132 and be executable by the CPU 210 thereof.

In operation 610, a plurality of images is obtained, as described previously. Operation 620 includes obtaining geolocation information for each of the images obtained at operation 610.

In operation 630, a home location is identified for the user. The home location can be identified in the manners previously described. In one implementation, the home located is identified by receiving information from the user that specifies the home location. In another implementation the home location is identified based on geolocation information by selecting the distinct geographical area of a largest image group from the plurality of image groups as the home location for the user. In another implementation, time information is obtained from the images and the home location is determined by identifying one or more time-based image clusters, and selecting the distinct geographical area of the image group having a largest number of time-based clusters as the home location for the user.

In operation 640, a group of images that does not correspond to the home location for the user is selected. This can be a group of images that were all recorded at locations outside of the home location. Operation 640 can be performed by defining a plurality of image groups that each include a plurality of images that correspond a distinct geographical area, determining whether each of these groups is inside or outside the home location, and selecting one of the groups that falls outside of the home location.

In operation 650, the images are stored in an image collection such as an album, and a title is assigned to the image collection. The title is based at least in part on a name of the distinct geographical area for the group of images that was identified at operation 640. This can be done in the manner described with respect to the titling component 330. Other descriptors can also be included in the title, as previously described.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method for organizing digital images by events, the method comprising:
   extracting, by a computing device, metadata from a plurality of digital images stored in a storage device, the metadata including image feature information, geolocation information, and time information, wherein the geolocation information includes distances between a plurality of geographical locations corresponding to the plurality of digital images and the image feature information is based on image characteristics including pixel values of the plurality of digital images;
   identifying, by the computing device, a related digital image group that includes a portion of the plurality of digital images from a common geographical area and a common time period, wherein the identifying is based on the metadata including the image feature information that the portion of the plurality of digital images has in common and a clustering algorithm that uses the time information and the geolocation information including the distances between the plurality of geographical locations that correspond to the portion of the plurality of digital images from the common geographical area and the common time period;
   grouping, by the computing device, the portion of the plurality of digital images in the related digital image group into a digital image collection based on a semantic relatedness of the image feature information in the portion of the plurality of digital images to a repository of feature information;
   identifying, for the digital image collection, by the computing device, an event, wherein the event is identified in a repository of event information based on the common time period and the common geographical area, and wherein the repository of event information comprises a publicly available source of event information;
   obtaining a home address of a user; and
   assigning, by the computing device, a title to the digital image collection, wherein
      in response to the geolocation information matching the home address, the title is based in part on a descriptor of the event and a descriptor of the time information, and
      in response to the geolocation information not matching the home address, the title is based in part on a descriptor of the geolocation information, and the descriptor of the time information.

2. The method of claim 1, wherein the repository of event information further comprises non-public information that is associated with the user.

3. The method of claim 1, wherein each of the plurality of digital images is associated with the user and the repository of event information further comprises calendar data associated with the user.

4. The method of claim 1, wherein each of the plurality of digital images is associated with the user and the repository of event information further comprises information obtained from electronic mail messages that are associated with the user.

5. The method of claim 1, wherein each of the plurality of digital images is stored at a server-based storage system and are associated with an account that is associated with the user.

6. The method of claim 1, further comprising:
   prior to assigning the title to the digital image collection, suggesting, by a titling component of an application hosting service, the title to a user for acceptance or rejection; and
   training the titling component of the application hosting service based on receipt of an acceptance or a rejection.

7. The method of claim 1, wherein the title is further based on a descriptor of a number of digital images in the digital image collection, a descriptor of proximity to a geolocation based on the geolocation information, a descriptor of a date range based on the time information, a descriptor of a person represented in the digital image collection, or a descriptor of a landmark in the digital image collection.

8. A system for organizing digital images by events, the system comprising:
   a computing device including a processor, network interface, and a memory, wherein the memory of the computing device includes applications executing instructions, wherein the applications comprise a data extraction component, a grouping component, and a titling component, and wherein the instructions are executable by the processor of the computing device to:
      extract, by a data extraction component, metadata from a plurality of digital images stored in a storage device, the metadata including image feature information, geolocation information and time information, wherein the geolocation information includes distances between a plurality of geographical locations corresponding to the plurality of digital images and the image feature information is based on image characteristics including pixel values of the plurality of digital images;
      identify, by the grouping component, a related digital image group that includes a portion of the plurality of digital images from a common geographical area and a common time period, wherein the identifying is based on the metadata including the image feature information that the portion of the plurality of digital images has in common and a clustering algorithm that uses the time information and the geolocation information including the distances between the plurality of geographical locations that correspond to the portion of the plurality of digital images from the common geographical area and the common time period;
      group, by the grouping component, the portion of the plurality of digital images in the related digital image group into a digital image collection based on a semantic relatedness of the image feature information in the portion of the plurality of digital images to a repository of feature information;
      identify, for the digital image collection, by the titling component, an event, wherein the event is identified in a repository of event information based on the common time period and the common geographical area, and wherein the repository of event information comprises a publicly available source of event information;
      obtain a home address of a user; and
      assign, by the titling component, a title to the digital image collection, wherein in response to the geolocation information matching the home address, the title is based in part on a descriptor of the event, the image feature information, and a descriptor of the time information, and in response to the geolocation information not matching the home address, the title is based in part on a descriptor of the geolocation information, the image feature information, and the descriptor of the time information.

9. The system of claim 8, wherein the plurality of digital images is a plurality of unorganized digital images.

* * * * *